United States Patent
Chen et al.

(10) Patent No.: US 10,719,707 B2
(45) Date of Patent: Jul. 21, 2020

(54) PEDESTRIAN DETECTION METHOD AND RELATED MONITORING CAMERA

(71) Applicant: VIVOTEK INC., New Taipei (TW)

(72) Inventors: Sheng-Yuan Chen, New Taipei (TW); Hsun-Shun Yu, New Taipei (TW); Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 71 days.

(21) Appl. No.: 16/188,289

(22) Filed: Nov. 13, 2018

(65) Prior Publication Data

US 2020/0151418 A1 May 14, 2020

(51) Int. Cl.
*G06K 9/00* (2006.01)

(52) U.S. Cl.
CPC ....... *G06K 9/0063* (2013.01); *G06K 9/00228* (2013.01); *G06K 9/00369* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,798,949 | B1* | 10/2017 | Du | G06K 9/46 |
| 2005/0232487 | A1* | 10/2005 | Fleisher | G01V 8/005 |
| | | | | 382/181 |
| 2008/0129844 | A1* | 6/2008 | Cusack | H04N 5/232 |
| | | | | 348/241 |
| 2011/0135151 | A1* | 6/2011 | Jang | H04N 5/23229 |
| | | | | 382/103 |
| 2014/0072170 | A1* | 3/2014 | Zhang | G06K 9/00624 |
| | | | | 382/103 |
| 2014/0347475 | A1* | 11/2014 | Divakaran | G06K 9/00771 |
| | | | | 348/135 |
| 2017/0039417 | A1* | 2/2017 | Saruta | G06K 9/00228 |

* cited by examiner

*Primary Examiner* — Tsung Yin Tsai
(74) *Attorney, Agent, or Firm* — Winston Hsu (57) ABSTRACT

A pedestrian detection method is applied to a monitoring camera. The pedestrian detection method includes forming a first detecting window on at least one monitoring frame via an object analysis function, utilizing a human form detection function to modulate the first detecting window for forming a second detecting window, analyzing the second detecting window via a human local detection function to mark an upper detecting window about a pedestrian on the monitoring frame, and determining whether to calibrate the second detecting window via analysis of the upper detecting window.

18 Claims, 8 Drawing Sheets

PEDESTRIAN DETECTION METHOD AND RELATED MONITORING CAMERA

BACKGROUND OF THE INVENTION

1. Field of the Invention

The present invention relates to a pedestrian detection method and a related monitoring camera, and more particularly, to a pedestrian detection method having advantages of low operation, preferred detection efficiency and great accuracy and a related monitoring camera.

2. Description of the Prior Art

A conventional monitoring camera utilizes human face detection or human form detection to scan the monitoring frame for tracing a pedestrian within a monitoring region via complicated operation. As the monitoring camera is fixed, the pedestrian may appear at any position or any angle inside the monitoring frame or move in any direction inside the monitoring frame. An image about the pedestrian within the monitoring frame may show a full body pattern when the pedestrian is in a spacious place, or show a partial body pattern when the pedestrian is sheltered by someone or something, so that the conventional monitoring camera is difficult to continuously trace the specific human face or the specific human form for a long term, and detection accuracy and tracing accuracy of the conventional monitoring camera are decreased by environmental interference easily.

SUMMARY OF THE INVENTION

The present invention provides a pedestrian detection method having advantages of low operation, preferred detection efficiency and great accuracy and a related monitoring camera for solving above drawbacks.

According to the claimed invention, a pedestrian detection method includes forming a first detecting window within at least one monitoring frame via an object analysis function, analyzing the first detecting window via a human form detection function to form a second detecting window, analyzing the second detecting window via a human local detection function to mark an upper detecting window about a pedestrian within the monitoring frame, and determining whether to calibrate the second detecting window by analysis of the upper detecting window.

According to the claimed invention, a monitoring camera with a pedestrian detection function includes an image receiver and an operation processor. The image receiver is adapted to receive an image stream having at least one monitoring frame. The operation processor is electrically connected to the image receiver and adapted to form a first detecting window within at least one monitoring frame via an object analysis function, to analyze the first detecting window via a human form detection function to form a second detecting window, to analyze the second detecting window via a human local detection function to mark an upper detecting window about a pedestrian within the monitoring frame, and to determine whether to calibrate the second detecting window by analysis of the upper detecting window.

For economizing the operational efficiency of the monitoring camera, the pedestrian detection method of the present invention can reduce the possible range inside the monitoring frame to the first detecting window via the object analysis function, and transform the first detecting window into the second detecting window via the human form detection function. The second detecting window can be similar to a size of the pedestrian within the monitoring frame, so the pedestrian detection method may analyze the second detecting window (or the local detection region inside the second detecting window) via the head detection technique or the face detection technique to find out the head contour or the face characteristic of the pedestrian, for economizing the operational ability of the monitoring camera and immediately acquiring the accurate detection result. In addition, the head contour or the face characteristic of the pedestrian can be used to calibrate the human form detection result, and the calibrated human form detection result can be used to calibrate the head contour or the face characteristic of the pedestrian; the foresaid calibration can be repeated to gradually acquire the exact position of the pedestrian and distinguish that the pedestrians are overlapped or near. The monitoring camera of the present invention can rapidly compute the highly-accurate pedestrian detection result through low level hardware when the pedestrian is positioned at any angle or any position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
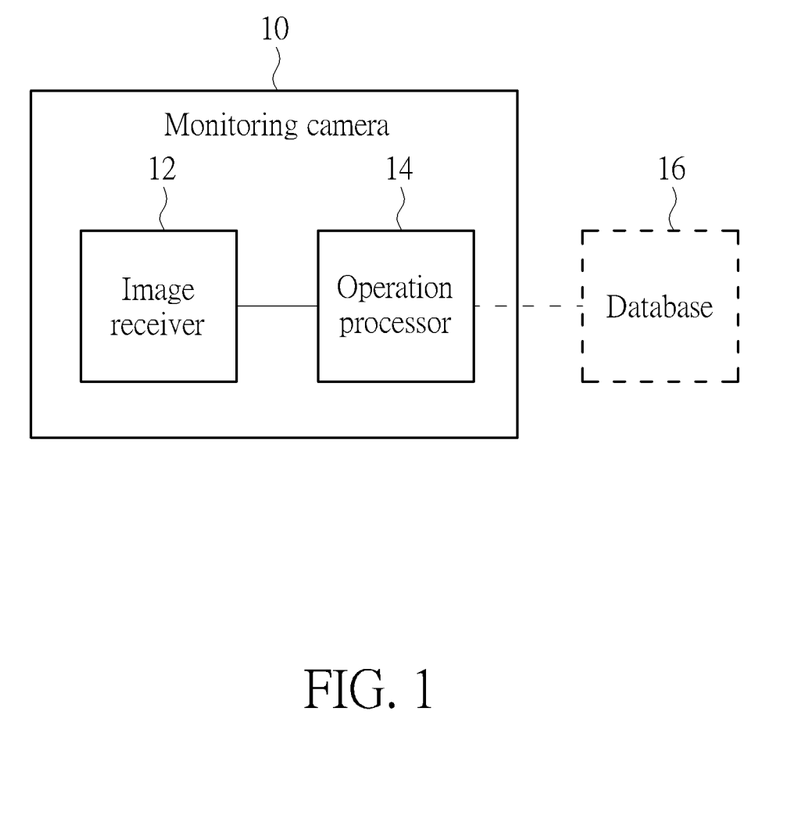
FIG. 1 is a functional block diagram of a monitoring camera according to an embodiment of the present invention.

Please refer to FIG. 1. FIG. 1 is a functional block diagram of a monitoring camera 10 according to an embodiment of the present invention. A pedestrian detection method illustrated in FIG. 2 can be suitable for the monitoring camera 10 shown in FIG. 1. The monitoring camera 10 can include an image receiver 12 and an operation processor 14. The monitoring camera 10 in installed inside a monitoring area. The image receiver 12 is used to acquire an image stream related to the monitoring area, and the image stream may include a plurality of monitoring frames. The operation processor 14 is electrically connected to the image receiver 12. The operation processor 14 can analyze at least one monitoring frame from the image stream via the pedestrian detection method of the present invention. Further, a parameter difference between the monitoring frames can be analyzed for the pedestrian detection method, and the said monitoring frames can be continuous or discontinuous. For example, the image stream may have ten monitoring frames, and the continuous means all the monitoring frames are analyzed in original order for the pedestrian detection method. In another embodiment, the discontinuous means some of the monitoring frames may be abandoned due to low quality; the monitoring frames having preferred quality can be used to execution of the pedestrian detection method. For instance, the monitoring frame having a pattern size about the pedestrian smaller than a predefined condition, or having an unanalyzable pattern about the pedestrian's face due to a setting angle of the monitoring camera 10, or having a blurred pattern about the pedestrian's face can be categorized as the low quality.

Figure 2:
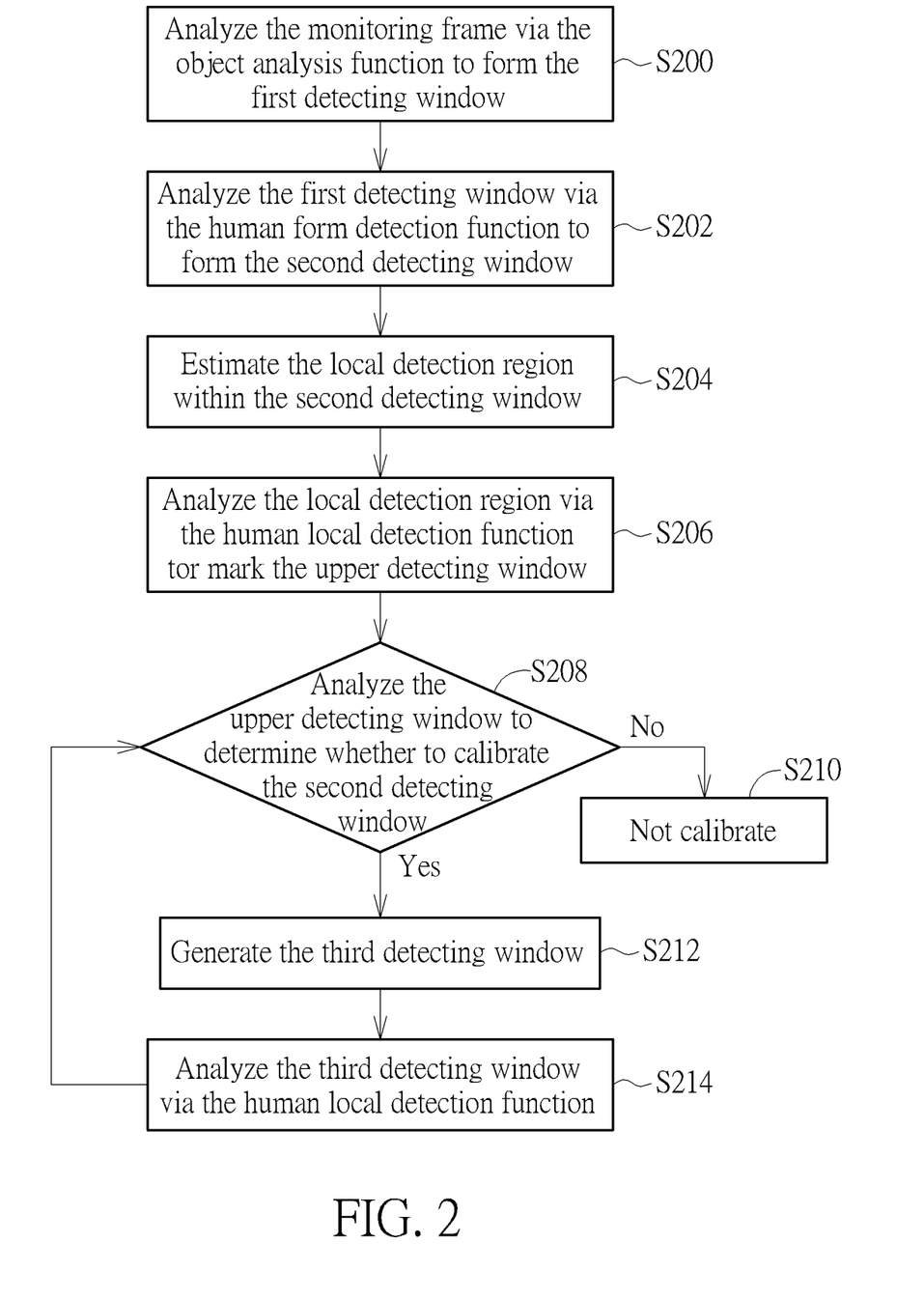
FIG. 2 is a flow chart of the pedestrian detection method according to the embodiment of the present invention.
Figure 3:
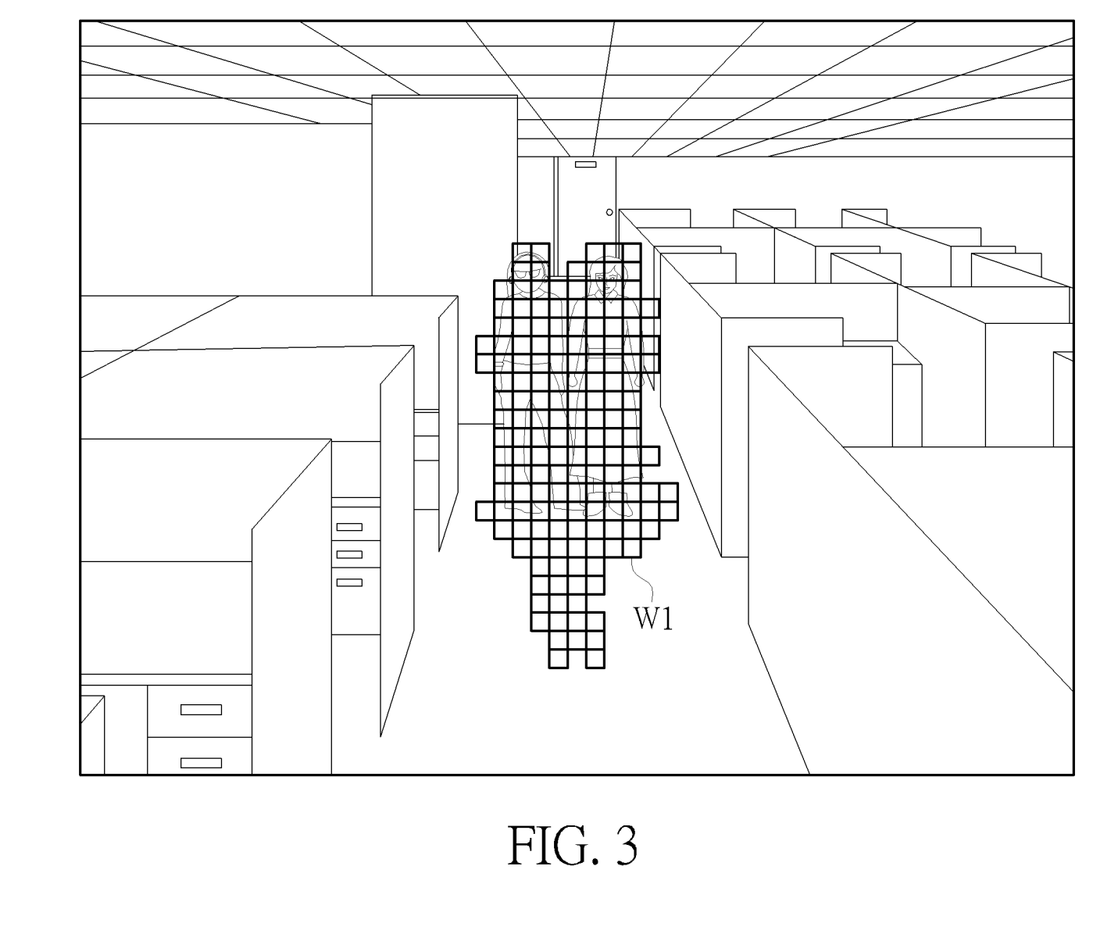
FIG. 3 to FIG. 7 are diagrams of the monitoring frame in different detection phases according to the embodiment of the present invention.

Please refer to FIG. 2 and FIG. 3 to FIG. 7. FIG. 2 is a flow chart of the pedestrian detection method according to the embodiment of the present invention. FIG. 3 to FIG. 7 are diagrams of the monitoring frame I in different detection phases according to the embodiment of the present invention. First, step S200 is executed that the pedestrian detection method can analyze the monitoring frame I via an object analysis function to form a first detecting window W1. The object analysis function can be selected from a group consisting of a motion detection function, an object tracking function, and a combination thereof. Any function capable of analyzing the image frame to acquire a position of an object belongs to a scope of the present invention. For example, the image stream may have the plurality of monitoring frames, so the pedestrian detection method can use the motion detection function to form the first detecting window W1 within the first monitoring frame, and then use the object tracking function to form the first detecting window W1 within the second monitoring frame; thus, the monitoring frames can be analyzed by a variety of object analysis functions. In addition, the pedestrian detection method may analyze all the monitoring frames via the motion detection function for forming the first detecting window W1, which means the monitoring frames are all analyzed by the same object analysis function. The pedestrian detection method can choose one or some of the object analysis functions applied to the monitoring frame according to specific factors, such as the image quality or other parameter, for acquiring the preferred pedestrian detection result.

The motion detection function can divide the monitoring frame I into several small regions, and compare intensity variation between regions respectively positioned at the same place of the previous monitoring frame I and the following monitoring frame I, so as to mark the regions having motion of the object. The marked regions can be defined as the first detecting window W1, as rectangular forms and an irregular shape formed by the rectangular forms shown in FIG. 3. A result of the motion detection function is a sketch but not an exact contour. Application of the motion detection function is not limited to the above-mentioned embodiment, and depends on design demand. The object tracking function is an object tracking algorithm based on visual search, which utilizes a position of the object within the previous monitoring frame as an initial point and estimates the position of the target object by inertia, or computes a value of surrounding difference about the current monitoring frame so as to move in a progressively decreasing direction until the difference smaller than a threshold for acquiring the position of the target object. A result of the object tracking function may not be the exact position and the exact contour of the pedestrian. Application of the object tracking function is not limited to the above-mentioned embodiment, and depends on design demand.

Figure 4:
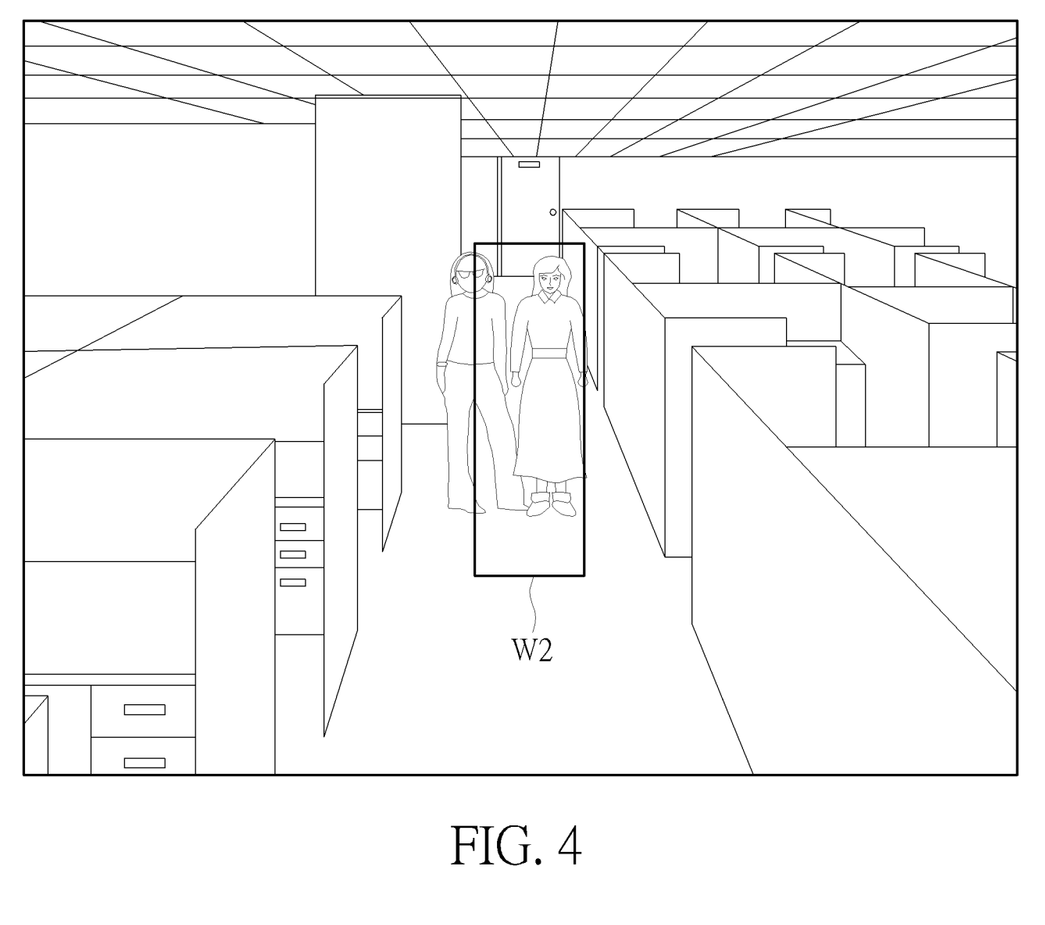
Figure 5:
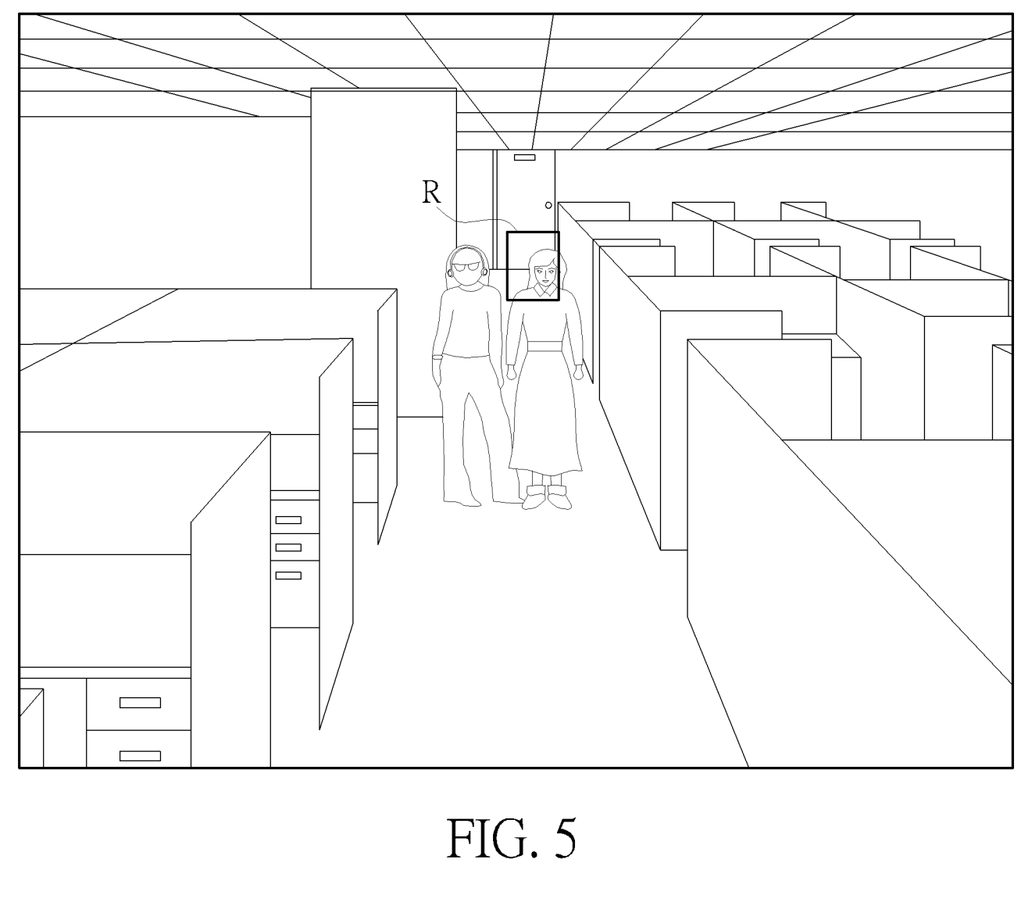
Figure 6:
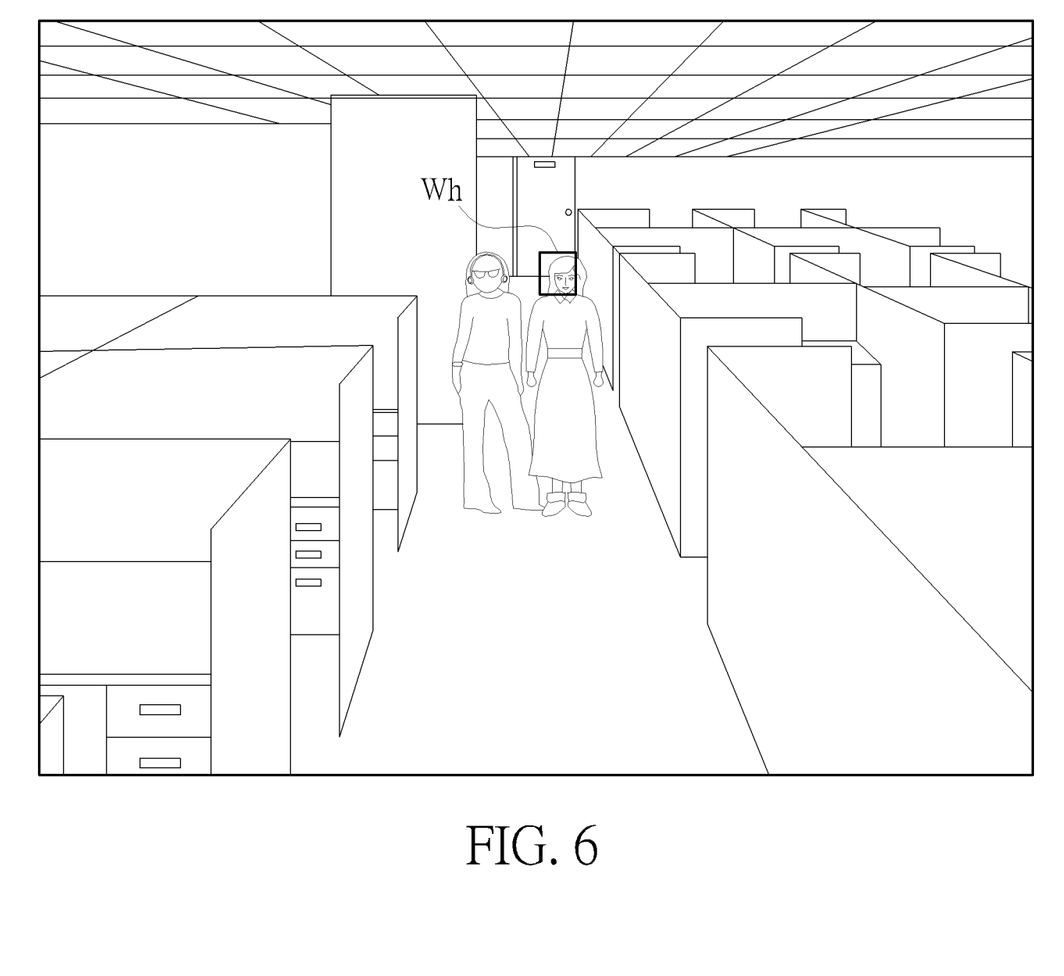

Step S202 is executed to analyze the first detecting window W1 via the human form detection function for forming the second detecting window W2, as shown in FIG. 4. Generally, the human form detection function can extract a boundary of intensity gradient according to background intensity variation or an angle of parallax, and a possible range of the pedestrian can be acquired as the second detecting window W2. Application of the human form detection function is not limited to the above-mentioned embodiment, and depends on design demand. Then, step S204 and step S206 are executed to estimate and form a local detection region R within the second detecting window W2, and to analyze the local detection region R via the human local detection function for marking an upper detecting window Wh of the pedestrian, as shown in FIG. 5 and FIG. 6. The local detection region R is formed to reduce the second detecting window W2. The human local detection function is applied to the small-size local detection region R, instead of the large-size second detecting window W2, and can have preferred execution efficiency. Step S204 is optional, so that the pedestrian detection method may not form the local detection region R and directly analyze the second detecting window W2 via the human local detection function.

It should be mentioned that the human local detection function of the present invention can include, but not be limited, a head detection technique and a face detection technique. The head detection technique can acquire a color-level change accumulated value of the second detecting window W2 to define a head size and a head position of the pedestrian. The face detection technique can acquire a face characteristic value of the second detecting window W2 to define the head size and the head position of the pedestrian. The head detection technique and the face detection technique are in need of complicated operation, therefore the present invention can utilize the object analysis function and the human form detection function to reduce the possible range where the pedestrian may appear within the monitoring frame I, and the human local detection function can accurately analyze the reduced area for preferred operational efficiency. The human form detection function shown in FIG. 3 can detect a full body range of the pedestrian; however, the human form detection function may detect a half body range of the pedestrian (which is not drawn in the figures) and then the human local detection function is used to find out the head contour or the face characteristic of the pedestrian.

Figure 7:
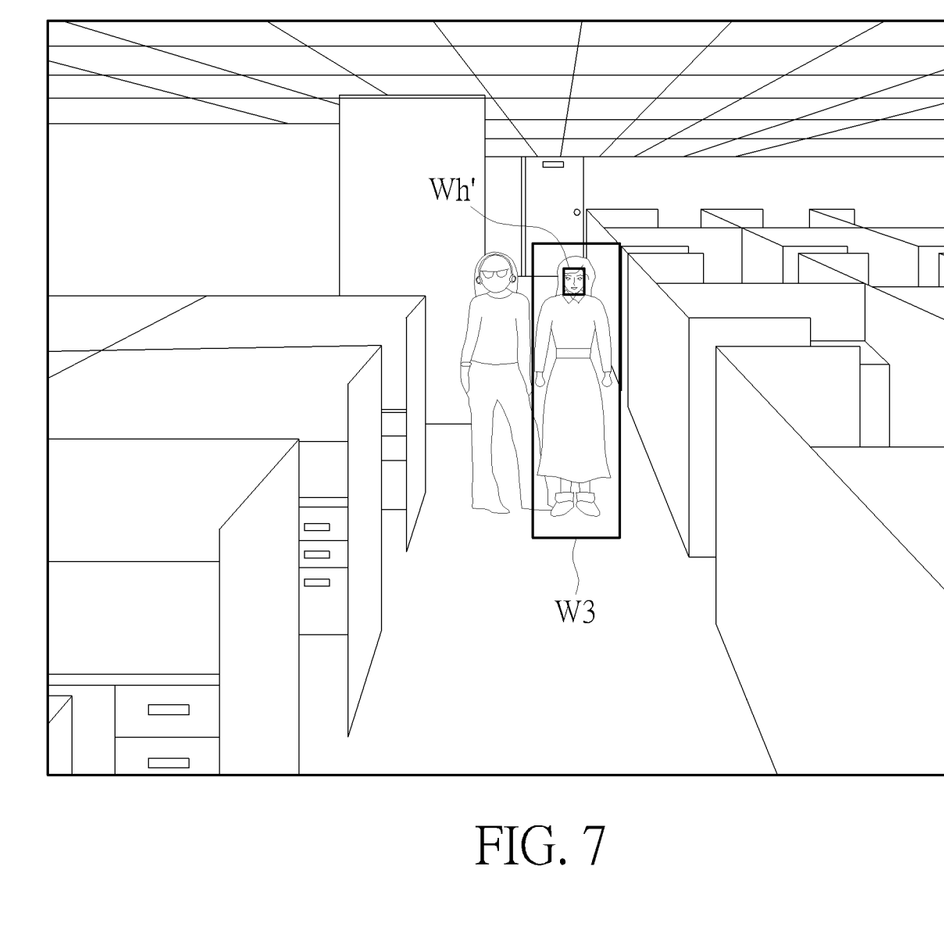

Step S208 is executed that the pedestrian detection method can analyze the upper detecting window Wh to determine whether to calibrate the second detecting window W2. For example, if the upper detecting window Wh is positioned around an estimated head range inside the second detecting window W2, the second detecting window W2 is determined as conforming to the position and the size of the pedestrian, so that step S210 is executed and the second detecting window W2 is not calibrated. If the upper detecting window Wh is distant from the estimated head range inside the second detecting window W2, step S212 is executed to generate a third detecting window W3 by calibration of the second detecting window W2 in accordance with a coordinate value difference between the upper detecting window Wh and the second detecting window W2, as shown in FIG. 7. Comparing the second detecting window W2 shown in FIG. 4 with the third detecting window W3 shown in FIG. 7, the second detecting window W2 may point patterns of two pedestrians, and the third detecting window W3 is shifted to the right for exactly pointing the pattern of the right-side pedestrian.

The pedestrian detection method of the present invention can further analyze the third detecting window W3 via the human local detection function and mark the upper detecting window Wh' in execution of step S214. The pedestrian detection method can utilize the upper detecting window Wh' to determine whether the third detecting window W3 conforms to a form of the pedestrian. When the third detecting window W3 does not conform to the form of the pedestrian, steps S208-S212 can be executed to calibrate the third detecting window W3. The pedestrian detection method can utilize the object analysis function and the human form detection function with low operation to estimate an approximate range of the pedestrian within the monitoring frame I, and optionally form the local detection region to reduce the possible range of the pedestrian within the monitoring frame I; then, the human local detection function with preferred accuracy and high operation can be used to mark the head or the face of the pedestrian. After marking the head or the face of the pedestrian, the upper detecting window can be analyzed to determine whether the head or the face is accurate, and the third detecting window can be calibrated if the head or the face is inaccurate. That is to say, the whole contour (such as the full body or the half body) and the local contour (such as the head or the face) of the pedestrian can be compared with each other repeatedly, for gradually computing the preferred detection result.

Step S208 can analyze the upper detecting window Wh via plural ways to determine whether to calibrate the second detecting window W2. For example, the monitoring camera 10 may have a built-in database (not shown in the figures) or be connected to an external database 16 in a wireless manner or in a wire manner. The database 16 can pre-store a lookup table, and the lookup table has scale information about a height and the head of the pedestrian. Someone having the small head may be short, and someone having the large head may be tall. The pedestrian detection method can analyze a size of the upper detecting window Wh to estimate a body size of the pedestrian according to the lookup table, and determine whether the second detecting window W2 conforms to an estimated body size of the pedestrian, then decide whether to calibrate the second detecting window W2. The pedestrian detection method can optionally analyze the upper detecting window Wh via the human form detection function, which means the upper detecting window Wh can be represented as the head or the face of the pedestrian for generating the human form detection result (such as the contour or the range). The second detecting window W2 can be calibrated according to a comparison between the human form detection result and the second detecting window W2. Further, the pedestrian detection method may define the upper detecting window Wh as the face or the head of the pedestrian, and directly shift the second detecting window W2 by a predetermined ratio according to the coordinate value of the upper detecting window Wh, for setting the upper detecting window Wh in a middle of the second detecting window W2.

Figure 8:
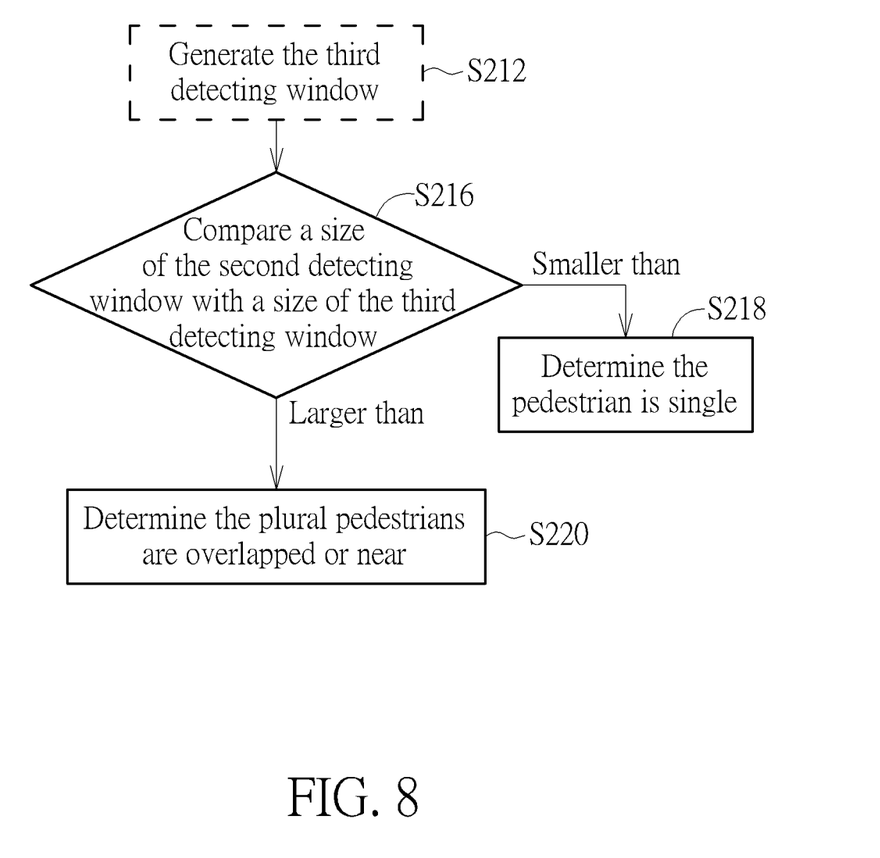
FIG. 8 is a flow chart of the pedestrian detection method according to another embodiment of the present invention.

Please refer to FIG. 8. FIG. 8 is a flow chart of the pedestrian detection method according to another embodiment of the present invention. The pedestrian detection method illustrated in FIG. 8 can be suitable for the monitoring camera 10 shown in FIG. 1. After execution of step S212, the pedestrian detection method can optionally execute step S216 to compare a size of the second detecting window W2 with a size of the third detecting window W3. If the second detecting window W2 is smaller than or equal to the third detecting window W3 or the second detecting window W2 is slightly larger than the third detecting window W3, the third detecting window W3 can be represented as deviation of the human form detection function, and step S218 can be executed to determine the pedestrian is single. If the second detecting window W2 is greater than the third detecting window W3 and a difference between the second detecting window W2 and the third detecting window W3 exceeds a predefined threshold, step S220 can be executed to determine the plural pedestrians are overlapped or near, and the pedestrian detection method can analyze a region of the second detecting window W2 not overlapped by the third detecting window W3 via the human local detection function to find out another pedestrian within the monitoring frame I. Then, step S204 can be executed to confirm and gradually reduce the detecting window of another pedestrian.

After execution of step S212, the pedestrian detection method of the present invention can only execute step S214, or only execute steps S216, S218 and S220, or alternately execute steps S214, S216, S218 and S220, which depends on actual demand and can be manually set by a control interface of the monitoring camera 10.

For economizing the operational efficiency of the monitoring camera, the pedestrian detection method of the present invention can reduce the possible range inside the monitoring frame to the first detecting window via the object analysis function, and transform the first detecting window into the second detecting window via the human form detection function. The second detecting window can be similar to a size of the pedestrian within the monitoring frame, so the pedestrian detection method may analyze the second detecting window (or the local detection region inside the second detecting window) via the head detection technique or the face detection technique to find out the head contour or the face characteristic of the pedestrian, for economizing the operational ability of the monitoring camera and immediately acquiring the accurate detection result. In addition, the head contour or the face characteristic of the pedestrian can be used to calibrate the human form detection result, and the calibrated human form detection result can be used to calibrate the head contour or the face characteristic of the pedestrian; the foresaid calibration can be repeated to gradually acquire the exact position of the pedestrian and distinguish that the pedestrians are overlapped or near. Comparing to the prior art, the monitoring camera of the present invention can rapidly compute the highly-accurate pedestrian detection result through low level hardware when the pedestrian is positioned at any angle or any position.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A pedestrian detection method, comprising:
forming a first detecting window within at least one monitoring frame via an object analysis function;
analyzing the first detecting window via a human form detection function to form a second detecting window;
analyzing the second detecting window via a human local detection function to mark an upper detecting window about a pedestrian within the monitoring frame;
determining whether to calibrate the second detecting window by analysis of the upper detecting window and further generating a third detecting window via calibration of the second detecting window;
comparing a size of the second detecting window with a size of the third detecting window; and
analyzing a region of the second detecting window not overlapped by the third detecting window via the human local detection function when the second detecting window is larger than the third detecting window, so as to mark another upper detecting window about another pedestrian within the monitoring frame.

2. The pedestrian detection method of claim 1, wherein analyzing the second detecting window via the human local detection function comprises:
setting a local detection region inside the second detecting window; and
analyzing the local detection region via the human local detection function.

3. The pedestrian detection method of claim 1, wherein the human local detection function is a head detection technique or a face detection technique.

4. The pedestrian detection method of claim 3, wherein the head detection technique acquires a color-level change accumulated value of the second detecting window to define a head size and a head position of the pedestrian.

5. The pedestrian detection method of claim 3, wherein the face detection technique acquires a face characteristic value inside the second detecting window to define a head size and a head position of the pedestrian.

6. The pedestrian detection method of claim 1, wherein the human form detection function is used to detect a full body range or a half body range of the pedestrian.

7. The pedestrian detection method of claim 1, wherein determining whether to calibrate the second detecting window by the analysis of the upper detecting window comprises:
connecting a database to acquire a lookup table; and
estimating a body size of the pedestrian via the lookup table and accordingly calibrate the second detecting window.

8. The pedestrian detection method of claim 1, wherein determining whether to calibrate the second detecting window by the analysis of the upper detecting window comprises:
analyzing the upper detecting window via the human form detection function; and
calibrating the second detecting window according to a result of the human form detection function.

9. The pedestrian detection method of claim 1, wherein determining whether to calibrate the second detecting window by the analysis of the upper detecting window comprises:
utilizing a coordinate value of the upper detecting window to calibrate a position of the second detecting window by a predetermined ratio.

10. The pedestrian detection method of claim 1, further comprising:
generating a third detecting window by calibration of the second detecting window; and
analyzing the third detecting window via the human local detection function to determine whether to calibrate the third detecting window.

11. The pedestrian detection method of claim 1, wherein the object analysis function is selected from a group consisting of a motion detection function, an object tracking function, and a combination thereof.

12. A monitoring camera with a pedestrian detection function, comprising:
an image receiver adapted to receive an image stream having at least one monitoring frame; and
an operation processor electrically connected to the image receiver and adapted to form a first detecting window within at least one monitoring frame via an object analysis function, to analyze the first detecting window via a human form detection function to form a second detecting window, to analyze the second detecting window via a human local detection function to mark an upper detecting window about a pedestrian within the monitoring frame, and to determine whether to calibrate the second detecting window by analysis of the upper detecting window and further generate a third detecting window via calibration of the second detecting window, to compare a size of the second detecting window with a size of the third detecting window, and to analyze a region of the second detecting window not overlapped by the third detecting window via the human local detection function when the second detecting window is larger than the third detecting window for marking another upper detecting window about another pedestrian within the monitoring frame.

13. The monitoring camera of claim 12, wherein the operation processor is further adapted to set a local detection region inside the second detecting window, and to analyze the local detection region via the human local detection function.

14. The monitoring camera of claim 12, wherein the human local detection function is a head detection technique or a face detection technique.

15. The monitoring camera of claim 12, wherein the operation processor is further adapted to connect a database to acquire a lookup table, and to estimate a body size of the pedestrian via the lookup table and accordingly calibrate the second detecting window.

16. The monitoring camera of claim 12, wherein the operation processor is further adapted to analyze the upper detecting window via the human form detection function, and to calibrate the second detecting window according to a result of the human form detection function.

17. The monitoring camera of claim 12, wherein the operation processor is further adapted to utilize a coordinate value of the upper detecting window to calibrate a position of the second detecting window by a predetermined ratio.

18. The monitoring camera of claim 12, wherein the operation processor is further adapted to generate a third detecting window by calibration of the second detecting window, and to analyze the third detecting window via the human local detection function to determine whether to calibrate the third detecting window.

* * * * *